United States Patent [19]

Althaus et al.

[11] Patent Number: 5,353,589
[45] Date of Patent: Oct. 11, 1994

[54] GAS TURBINE PLANT HAVING A WATER OR STEAM COOLED ENERGY EXCHANGER

[75] Inventors: Rolf Althaus, Flawil; Erwin Zauner, Baden, both of Switzerland

[73] Assignee: Asea Brown Boveri Ltd., Baden, Switzerland

[21] Appl. No.: 74,657

[22] Filed: Jun. 10, 1993

[30] Foreign Application Priority Data

Jun. 19, 1992 [DE] Fed. Rep. of Germany ....... 4220073

[51] Int. Cl.5 ................................................ F02C 3/20
[52] U.S. Cl. ................................... 60/39.45; 60/39.58
[58] Field of Search .................. 60/39.45 A, 39.45 R, 60/39.58

[56] References Cited

U.S. PATENT DOCUMENTS

| | | | |
|---|---|---|---|
| 3,398,525 | 8/1968 | Jenny | 60/39.45 A |
| 4,679,393 | 7/1987 | Hellat et al. | 60/39.45 A |
| 5,282,354 | 2/1994 | Keller | 60/39.45 |

FOREIGN PATENT DOCUMENTS

| | | |
|---|---|---|
| 928857 | 6/1955 | Fed. Rep. of Germany . |
| 2445836 | 4/1976 | Fed. Rep. of Germany ..... 60/39.45 R |
| 3514718A1 | 10/1985 | Fed. Rep. of Germany . |
| 0054927 | 5/1981 | Japan ............ 60/39.58 |

*Primary Examiner*—Richard A. Bertsch
*Assistant Examiner*—William Wicker
*Attorney, Agent, or Firm*—Burns, Doane, Swecker & Mathis

[57] ABSTRACT

The use of a pressure wave machine as energy exchanger (C) in a gas turbine plant makes it possible, owing to the self-cooling cellular wheel (22), to employ substantially higher temperatures. However, in order to be able to make full use of this advantage, steam cooling (13) is applied for the low-pressure gas outlet ducts (35, 37), while in addition means are provided for utilizing the heated cooling steam in a part of the gas turbine, for example in the combustion chamber (D) or in the turbine (B).

2 Claims, 2 Drawing Sheets

GAS TURBINE PLANT HAVING A WATER OR STEAM COOLED ENERGY EXCHANGER

BACKGROUND OF THE INVENTION

1. Field of the Invention

The invention relates to a gas turbine plant.

2. Discussion of Background

A known pressure wave machine for a gas turbine of this kind can cope with relatively high temperatures owing to the cellular wheel, since in the latter not only compression but also expansion take place, so that the cellular wheel has a self-cooling action. In order to be able to make full use of the advantages of the pressure wave machine, namely the utilization of relatively high temperatures, it is necessary to cool certain parts of the pressure wave machine. Hitherto cooling air for these parts was taken from the compressor of the gas turbine plant. In the low-pressure outlet duct of the pressure wave machine the surfaces to be cooled are large in comparison with the high-pressure inlet duct. A relatively large amount of cooling air is therefore required and must be taken from the compressor of the basic machine and is thus not available for the pressure wave machine, that is to say the energy of the cooling air is lost to the potential of the upper stage process and also to the shaft output and efficiency of the entire plant. In addition, this energy cannot be immediately recovered.

SUMMARY OF THE INVENTION

Accordingly, one object of the invention is to provide a novel gas turbine plant in which cooling of the energy exchanger is achieved with the smallest possible loss of energy.

According to the invention this problem is solved by using water or steam to cool the outlet conduits of the energy exchanger.

Through the use of water for cooling the cooling loss is smaller, because cooling air no longer has to be taken from the compressor. This gives the advantage that on the one hand less energy is lost in cooling and on the other hand this lost energy can be recovered because means are provided for utilizing the heated or evaporated cooling water.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
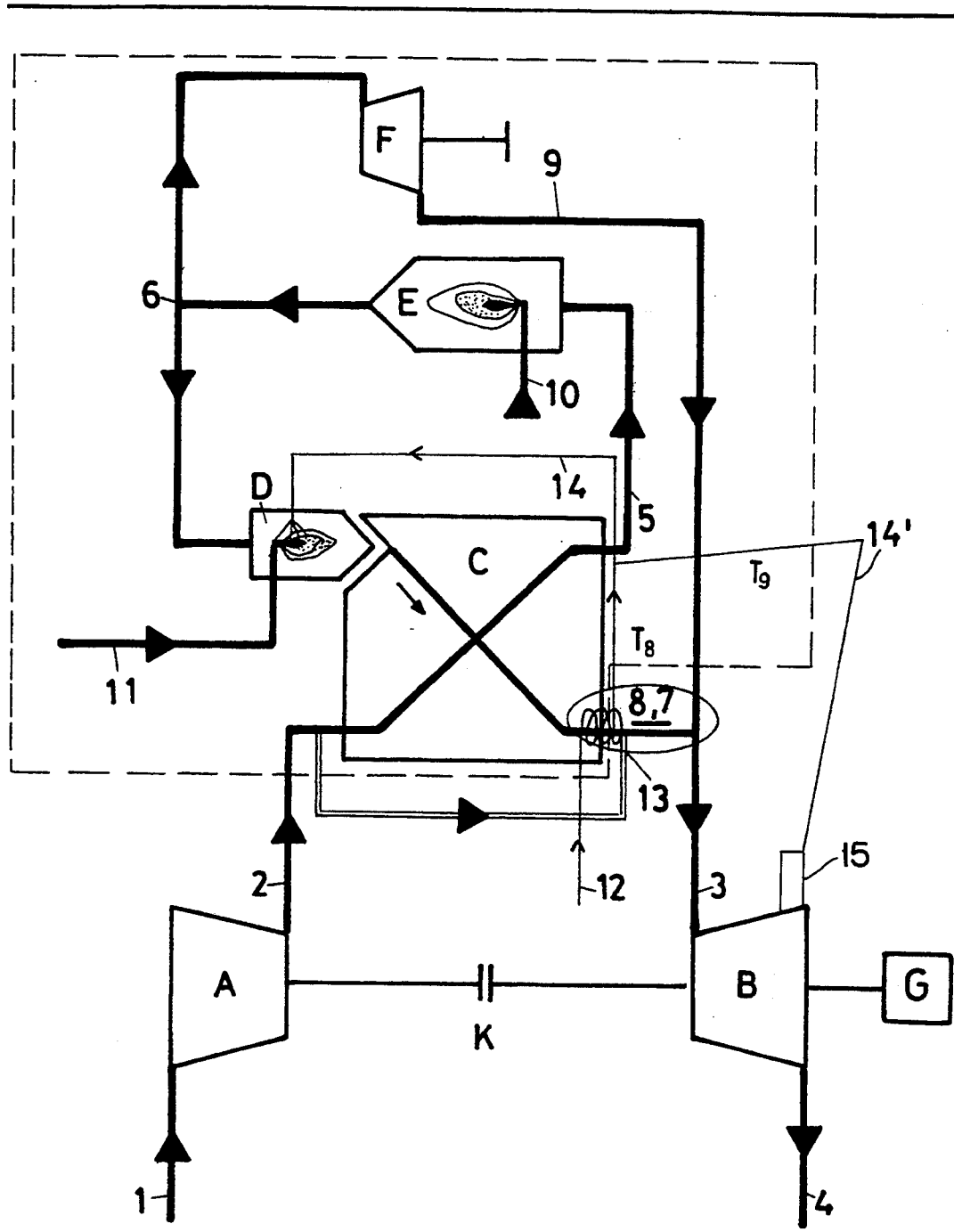
FIG. 1 is a schematic representation of the entire gas turbine plant.

Referring now to the drawings, wherein like reference numerals designate identical or corresponding parts throughout the several views, in FIG. 1 a turbine B is drivingly connected by means of a coupling K to a compressor A. As indicated by arrows, compressed air passes through a line 1 into the compressor A. The further compressed air passes through the line 2 out of the compressor A into an energy exchanger C, which is in the form of a pressure wave machine, which is described more fully further on with reference to FIG. 2. As is also indicated by arrows, gas passes from the energy exchanger C into the turbine B through a line 3. The gas passing out of the turbine B flows into a line 4. The turbine B is drivingly connected to a generator G and is therefore able to drive both the compressor A and the generator G with the gas coming from the line 3. In addition, a combustion chamber E is connected via a line 5 to the energy exchanger C. Through this line 5 the compressed air further compressed in the energy exchanger passes into the combustion chamber E. Fuel is supplied to the combustion chamber E through a line 10. The gas produced by the combustion passes from the combustion chamber E through the line 6 on the one hand to a high-pressure turbine F and on the other hand to an afterburner D, which is connected to the energy exchanger C. Fuel is supplied to said afterburner D through a line 11. The gas passing out of the afterburner D is expanded in the energy exchanger C and passes via the line 3 into the turbine B. The compressed air entering the energy exchanger C from the line 2 is further compressed before it passes via the line 5 into the combustion chamber E. The gas passing out of the high-pressure turbine F passes via the line 9 and the line 3 into the basic turbine B. A water line 12 leads to an outlet opening 13 which is provided on the energy exchanger C and to which the line 3 is connected. A cooling medium, for example water or steam, is supplied through said line 12 to cool this outlet opening 13 or outlet duct 13. The cooling medium passes from the outlet opening 13 via a line 14 to the afterburner D. The amount of cooling medium required at the outlet opening is then injected into the after-burner D. It is also possible to use this cooling medium in the turbine B, that is to say the cooling medium is supplied to the turbine B via the line 14'. A cooling device 15, which receives the heated medium from line 14', is disposed in the basic turbine to supply the medium to the turbine in a way suitable for cooling. The construction of the energy exchanger C is described below in greater detail with reference to FIG. 2:

A cellular wheel 22 is situated between two side walls 20 and 21 and moves in the direction of the arrow 23 relative to the side walls 20 and 21. This cellular wheel 22 has a number of compartments 24, which extend uniformly over the entire periphery of the cellular wheel 22. Of these compartments 24, however, only three compartments 24 are shown in the drawing.

In the two side walls 20 and 21 a number of inlet and outlet ducts for the air and for the gas are provided, namely:

a) For the air:
In the one side wall 20:
- a high-pressure outlet duct 30
- a low-pressure inlet duct 31;
In the other side wall 21:
- a high-pressure outlet duct 32
- a low-pressure inlet duct 33;

b) For the gas:
In the one side wall 20:
- a high-pressure inlet duct 34
- a low-pressure outlet duct 35;
In the other side wall 21:
- a high-pressure inlet duct 36
- a low-pressure outlet duct 37.

Arrows clearly distinguish the inlet ducts from the outlet ducts. The high-pressure ducts are substantially narrower than the low-pressure ducts.

The direction of flow of the air is indicated by solid arrows 38 and 39. The direction of flow of the gases is indicated by dashed arrows 40 and 41.

Figure 2:
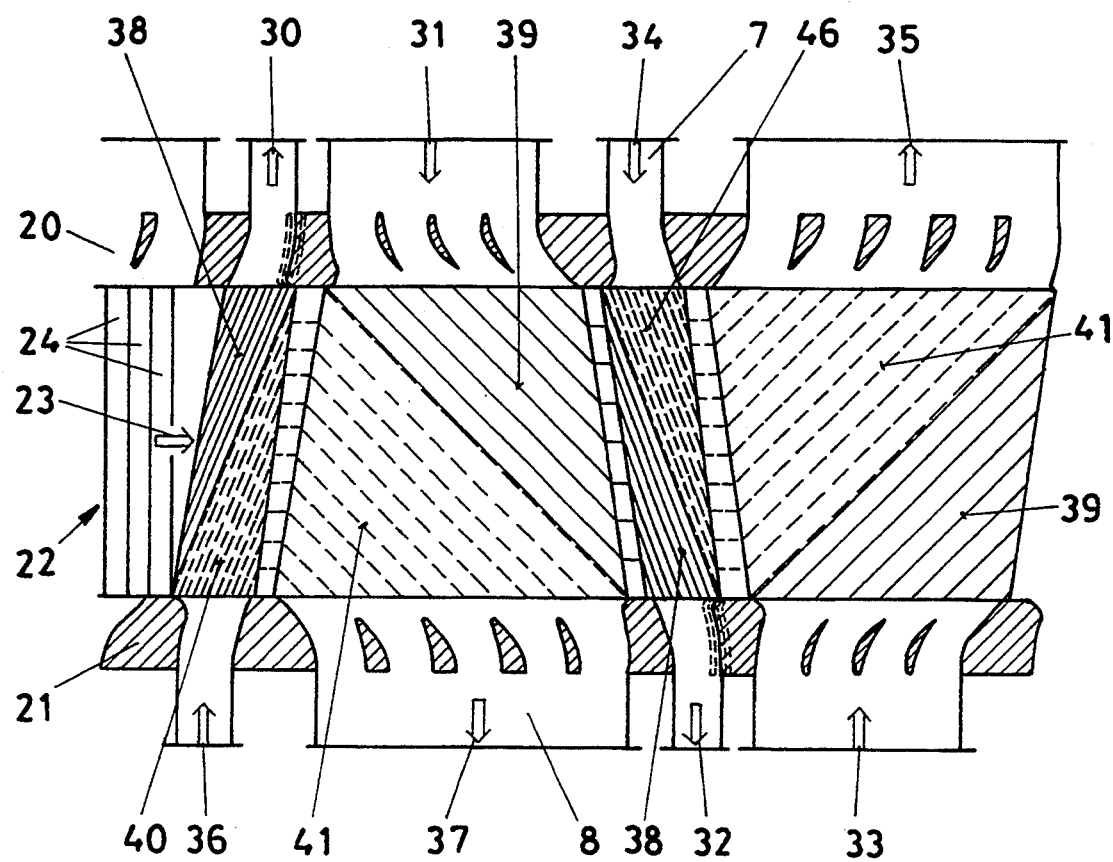
FIG. 2 shows schematically a developed view of a cylindrical section, at mid-height, of the cells of the cellular wheel, and a section through the neighboring parts of a pressure wave machine.

From FIG. 2 it can be seen that the gas enters the energy exchanger by way of high-pressure ducts 34, 36 and passes out by way of low-pressure ducts 35, 37, and that conversely the air enters through low-pressure ducts 31, 33 and passes out through high-pressure ducts 30, 32. This means that in the energy exchanger the gas expands and the air is compressed. Part of the gas flows in at the high-pressure inlet duct 34 and flows out again via the low-pressure outlet duct 35. Another part of the gas enters at the high-pressure inlet duct 36 and flows out via the low-pressure outlet duct 37. This means that the one part of the gas flows both in and out on the one side wall 20 and the other part of the gas flows in and out at the other side wall 21, and that one part of the air flows in at the one side wall 20 and flows out at the other side wall 21, while conversely the other part of the air flows in at the other side wall 21 and flows out at the first side wall 20.

For the cooling
a) of the low-pressure outlet ducts 35, 37
b) of the combustion chamber D or
c) of the basic turbine B
water may also be used instead of steam.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A gas turbine plant, comprising:
   a compressor;
   a dynamic pressure machine which operates as an energy exchanger connected downstream of the compressor;
   a first combustion chamber downstream of a high pressure outlet of the energy exchanger;
   a high pressure turbine connected to a first branch downstream of the first combustion chamber;
   a second combustion chamber connected on a second branch downstream of the first combustion chamber, the second combustion chamber connected to a high pressure inlet of the energy exchanger, wherein a portion of the heated gases from the first combustion chamber is directed to the high pressure turbine and a portion to the second combustion chamber;
   a basic turbine connected downstream of a low pressure outlet of the energy exchanger, wherein an exhaust gas stream from the high pressure turbine is mixed with gas from the low pressure outlet of the energy exchanger to drive the basic turbine; and,
   means for cooling the low pressure outlet of the energy exchanger with one of a water and steam medium and injecting the heated medium into the second combustion chamber.

2. A gas turbine plant as claimed in claim 1, further comprising a cooling device, to which the heated cooling medium is supplied in order to cool the basic turbine, disposed in the basic turbine.

* * * * *